US012759181B2

(12) United States Patent
Maddalon

(10) Patent No.: US 12,759,181 B2
(45) Date of Patent: Oct. 13, 2026

(54) AUTOMATIC CUTTING DEVICE FOR PRINTED SUPPORTS

(71) Applicant: FOTOBA INTERNATIONAL S.R.L., Quaregna Cerreto (IT)

(72) Inventor: Valter Maddalon, Pralungo (IT)

(73) Assignee: FOTOBA INTERNATIONAL S.R.L., Quaregna Cerreto (IT)

( * ) Notice: Subject to any disclaimer, the term of this patent is extended or adjusted under 35 U.S.C. 154(b) by 888 days.

(21) Appl. No.: 18/001,327

(22) PCT Filed: Jun. 18, 2021

(86) PCT No.: PCT/IB2021/055389
§ 371 (c)(1),
(2) Date: Dec. 9, 2022

(87) PCT Pub. No.: WO2022/003471
PCT Pub. Date: Jan. 6, 2022

(65) Prior Publication Data
US 2023/0234255 A1 Jul. 27, 2023

(30) Foreign Application Priority Data
Jun. 30, 2020 (IT) ........................ 102020000015700

(51) Int. Cl.
*B26D 7/26* (2006.01)
*B26D 1/24* (2006.01)
*B26D 7/20* (2006.01)

(52) U.S. Cl.
CPC ........... *B26D 7/2635* (2013.01); *B26D 1/245* (2013.01); *B26D 7/20* (2013.01)

(58) Field of Classification Search
CPC .......... B26D 7/20; B26D 1/205; B26D 1/185; B26D 1/2635; B26D 1/2657; B26D 1/245;
(Continued)

(56) References Cited

U.S. PATENT DOCUMENTS 3,763,748 A * 10/1973 Gallagher, Jr. ........ B23D 47/00 83/402
4,003,276 A * 1/1977 Schmitt ................ B26D 7/1863 83/100
(Continued)

FOREIGN PATENT DOCUMENTS

WO 2019209279 A1 10/2019

OTHER PUBLICATIONS

International Search Report and Written Opinion for Corresponding International Application No. PCT/IB2021/055389, 10 pages, Oct. 27, 2021.

*Primary Examiner* — Laura M Lee
(74) *Attorney, Agent, or Firm* — LUCAS & MERCANTI, LLP

(57) ABSTRACT

The present disclosure provides an automatic cutting device for printed supports which allows to compensate for the space created between the sliding planes, so as to always sustain the support to be cut and allow it to pass from one sliding plane to another and reach the relative unloading rollers avoiding jam at the device outlet. This result is achieved by means of an array of fins supported at the second sliding plane, configured to move from a closed configuration, in which all the fins protrude from the second sliding plane towards the first sliding plane and occupy the transverse cutting zone, to an open configuration in which they leave the transverse cutting area free so as to allow undisturbed movement of the cutting unit. This array of fins in closed configuration sustains the printed support cut in the passage from the first sliding plane to the second sliding plane.

5 Claims, 6 Drawing Sheets

(58) Field of Classification Search
CPC ..... B26D 2007/1809; B26D 2007/1872; B41J 11/02; Y10T 83/2216; Y10T 83/4847; Y10T 83/7876; Y10T 83/6582; Y10T 83/222; Y10T 83/2192
USPC ................................ 83/424, 508.3, 349, 165
See application file for complete search history.

(56) References Cited

U.S. PATENT DOCUMENTS

| | | | | |
|---|---|---|---|---|
| 4,506,577 | A * | 3/1985 | Shinomiya | B26D 5/04 83/564 |
| 5,165,314 | A * | 11/1992 | Paulson | B26D 7/015 83/594 |
| 5,435,217 | A * | 7/1995 | Kato | B26D 1/205 83/100 |
| 5,761,980 | A * | 6/1998 | Ima | B26D 7/20 83/508.3 |
| 6,165,117 | A * | 12/2000 | Adami | B26D 7/088 83/477.1 |
| 8,342,068 | B2 * | 1/2013 | Adami | B26D 7/2635 83/498 |
| 9,364,963 | B2 * | 6/2016 | Alberto | B26D 5/32 |
| 11,548,179 | B2 * | 1/2023 | Ormaechea Saracibar | B26D 1/205 |
| 2016/0068362 | A1 | 3/2016 | Oyane et al. | |
| 2021/0331496 | A1 * | 10/2021 | Ruiz Martinez | B26D 1/245 |

* cited by examiner

AUTOMATIC CUTTING DEVICE FOR PRINTED SUPPORTS

CROSS-REFERENCE TO RELATED APPLICATIONS

This application is a 371 of PCT/IB2021/055389, filed Jun. 18, 2021, which claims the benefit of Italian Patent Application No. 102020000015700, filed Jun. 30, 2020.

TECHNICAL FIELD

The present disclosure refers in general to the cutting of printed supports on which a plurality of images are printed, such as in particular tapes of photographic paper, fabric, PVC and the like in the form of sheets or rolled up.

BACKGROUND

Automatic cutting devices comprise one or more longitudinal cutting units suitable for allowing the cutting of a printed support according to one or more directions parallel to the feeding direction and a transversal cutting unit suitable for allowing the cutting of the substrate perpendicular to the feeding direction.

The single images are obtained thanks to the cuts made by these devices starting from sheets or reels of printed supports having various characteristics and dimensions, with images of various sizes printed on them in order to optimize the consumption of the support and to increase the printing speed.

The transverse cutting unit is typically movable along a first transverse guide, while the longitudinal cutting units are typically constrained to a second transverse guide along which they are locked in predetermined positions in order to obtain the necessary cuts in order to isolate the images.

A cutting device of this type is schematically illustrated in FIG. 1. It substantially comprises two sliding planes 1 and 2 of a printed substrate 11, an optical code 3 which is read by the electronics of the reader 4 allowing the automatic positioning of the groups of longitudinal cut 5.

It has been noted that, once the cut of the printed support 11 has been made in the transversal cutting area comprised between the two sliding planes 1 and 2 of the cutting device, there is a risk that the free edge of the advancing cut printed support goes under the sliding surface downstream of the cutting units 5-10.

SUMMARY

To obviate these limitations, the present disclosure provides a cutting device which has means to allow occupation of the space created between the sliding planes, so as to always sustain the support to be cut and to allow it to pass from a plane to the other and to reach the relative unloading rollers avoiding jam at the device outlet.

This result has been achieved in a cutting device as defined in claim 1. Preferred embodiments are defined in the dependent claims.

DETAILED DESCRIPTION

Figure 1:
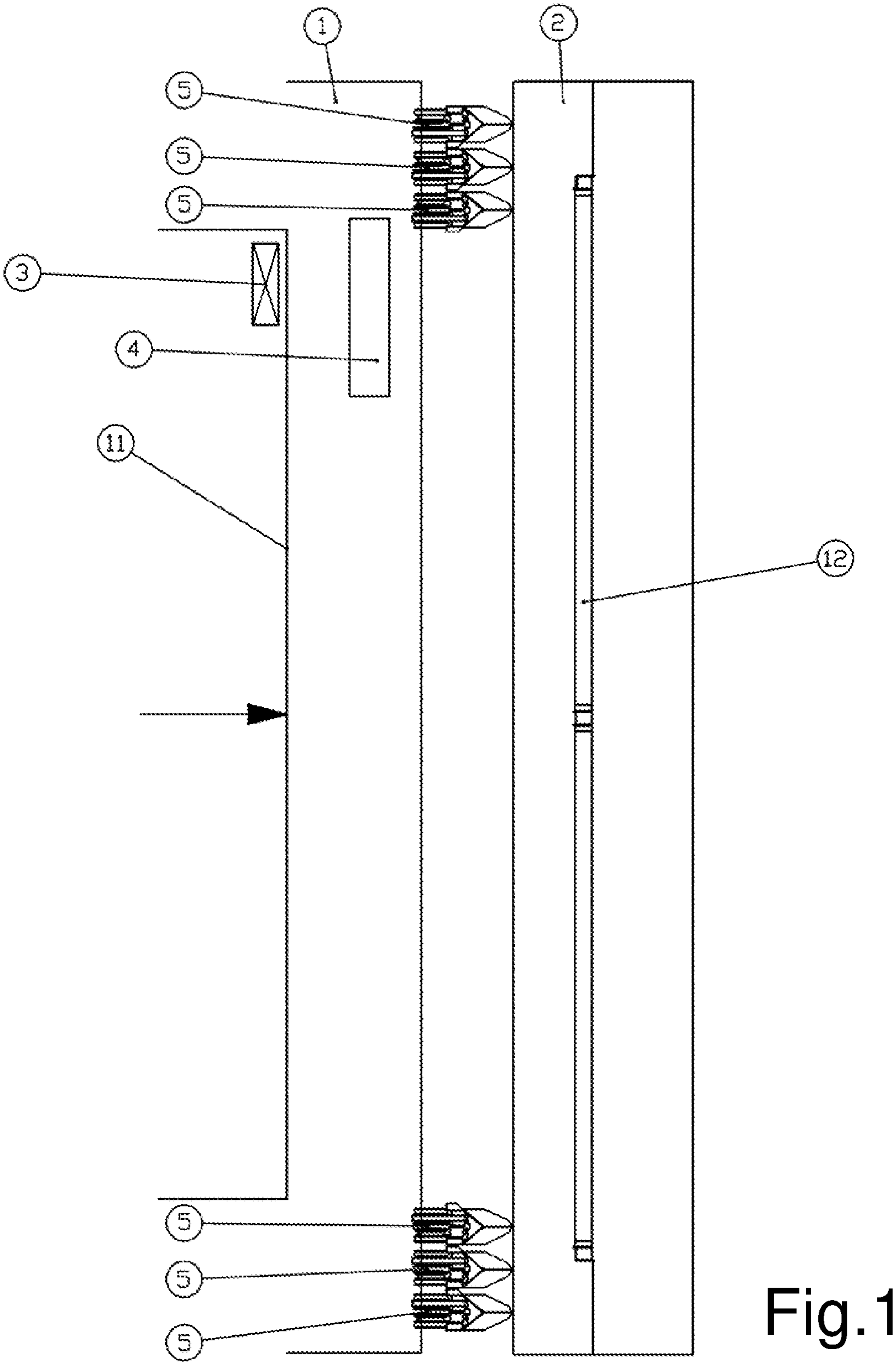
FIG. 1 represents a schematic top view of an automatic cutting device according to the known art.
Figure 2B:
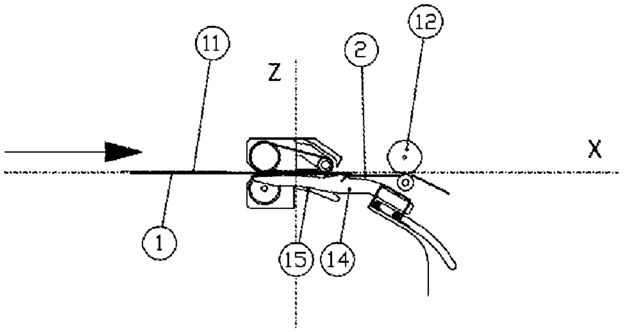
FIG. 2B represents a profile view of the device of FIG. 2A.
Figure 2A:
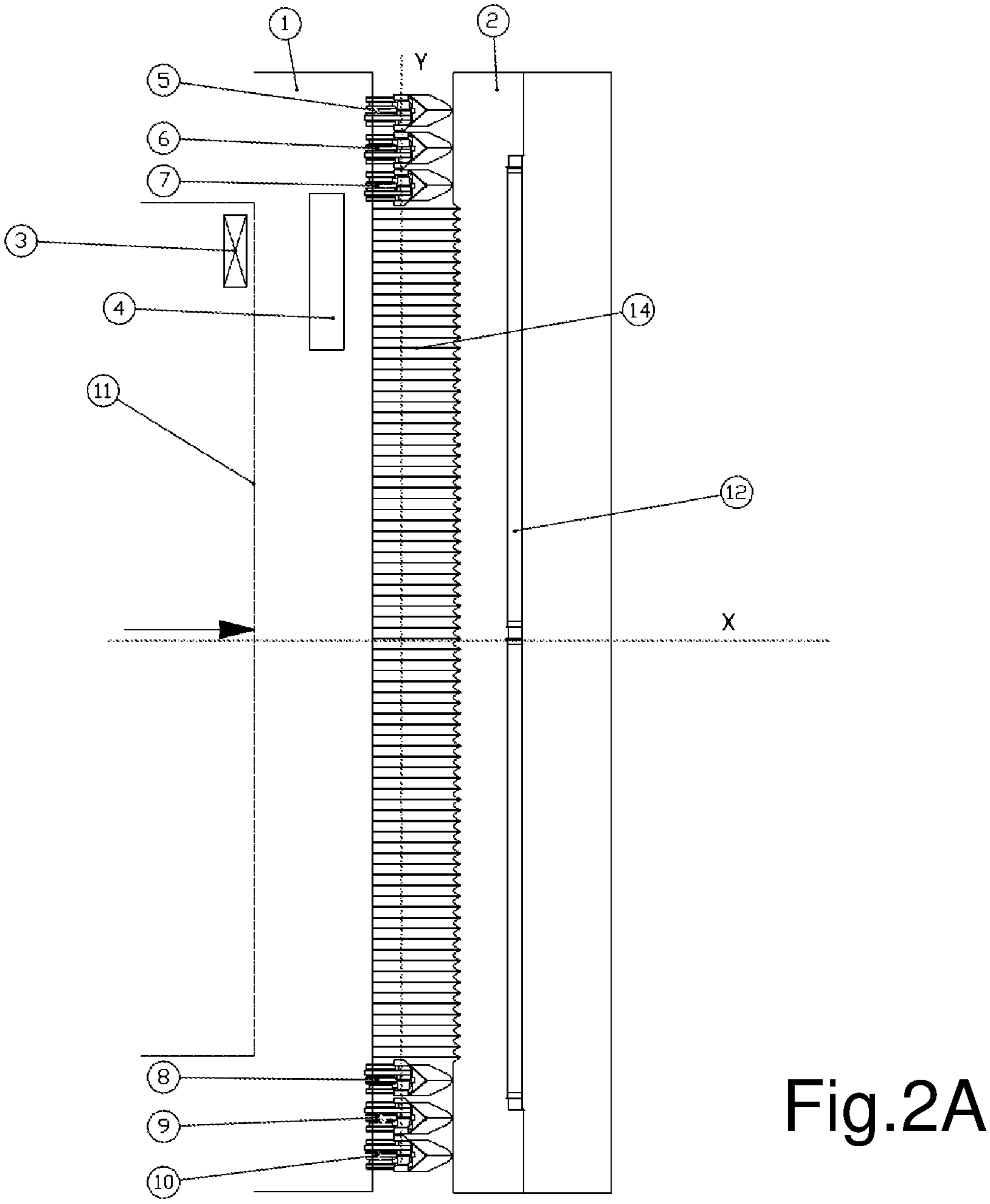
FIG. 2A represents a schematic top view of an automatic cutting device according to the present disclosure in the closed configuration of the fin array and in which no longitudinal cutting unit is positioned within the transverse cutting zone for longitudinally cutting the printed support.
Figure 3B:
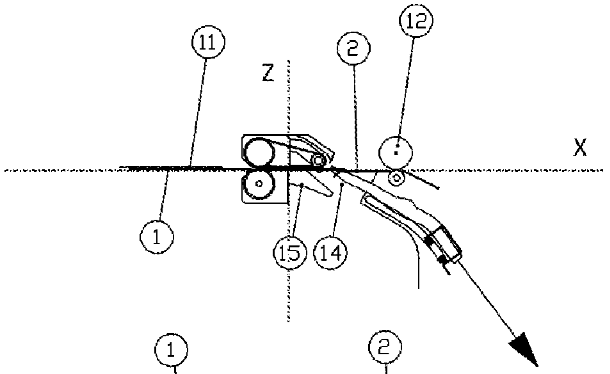
FIG. 3B represents a profile view of the device of FIG. 3A.
Figure 3A:
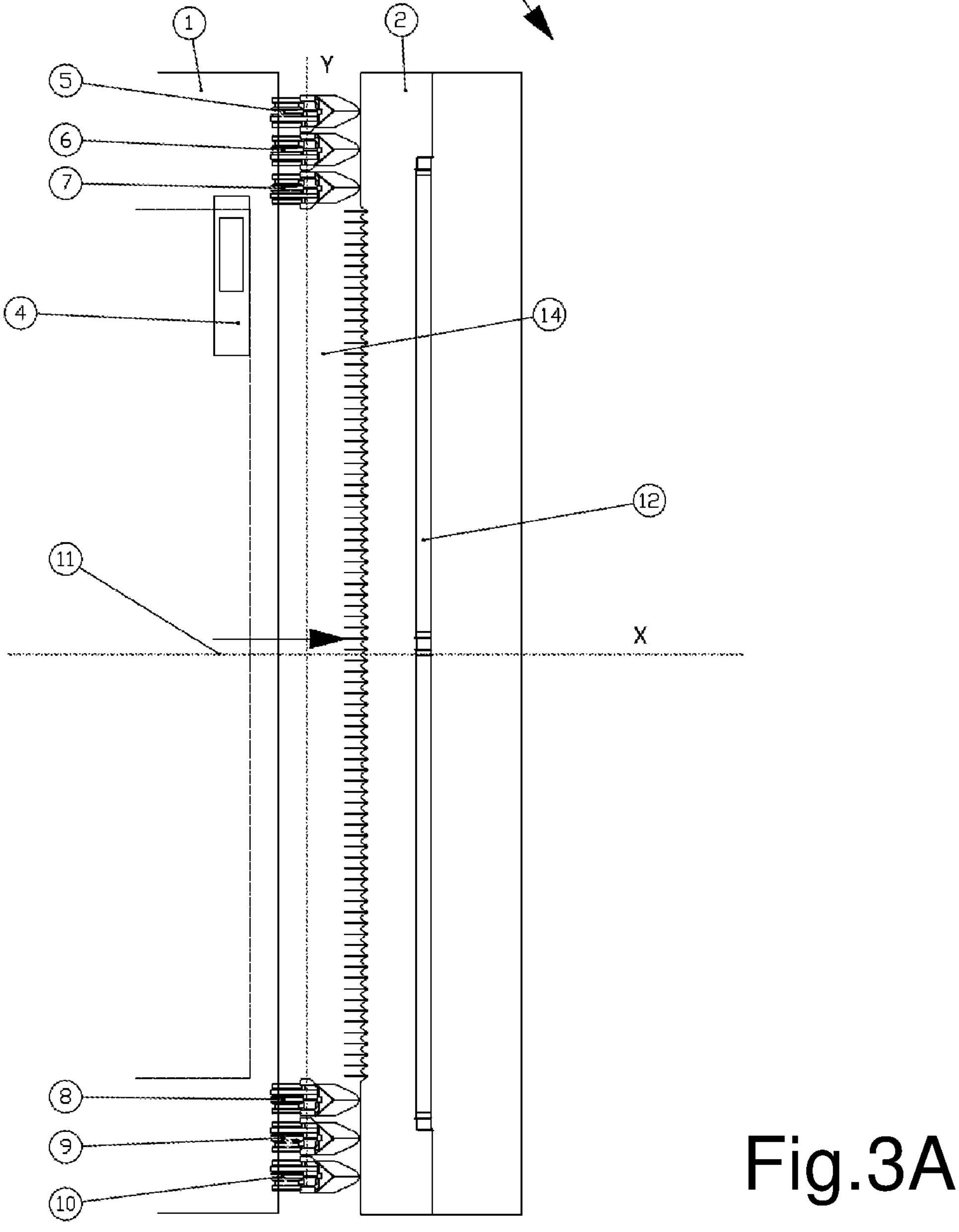
FIG. 3A represents a schematic top view of the automatic cutting device according to the present disclosure in the open configuration of the array of fins.
Figure 4B:
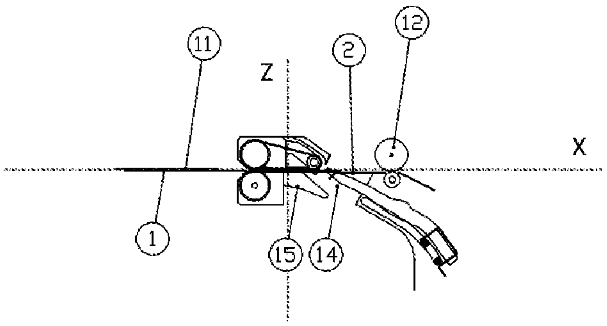
FIG. 4B represents a profile view of the device of FIG. 4A.
Figure 4A:
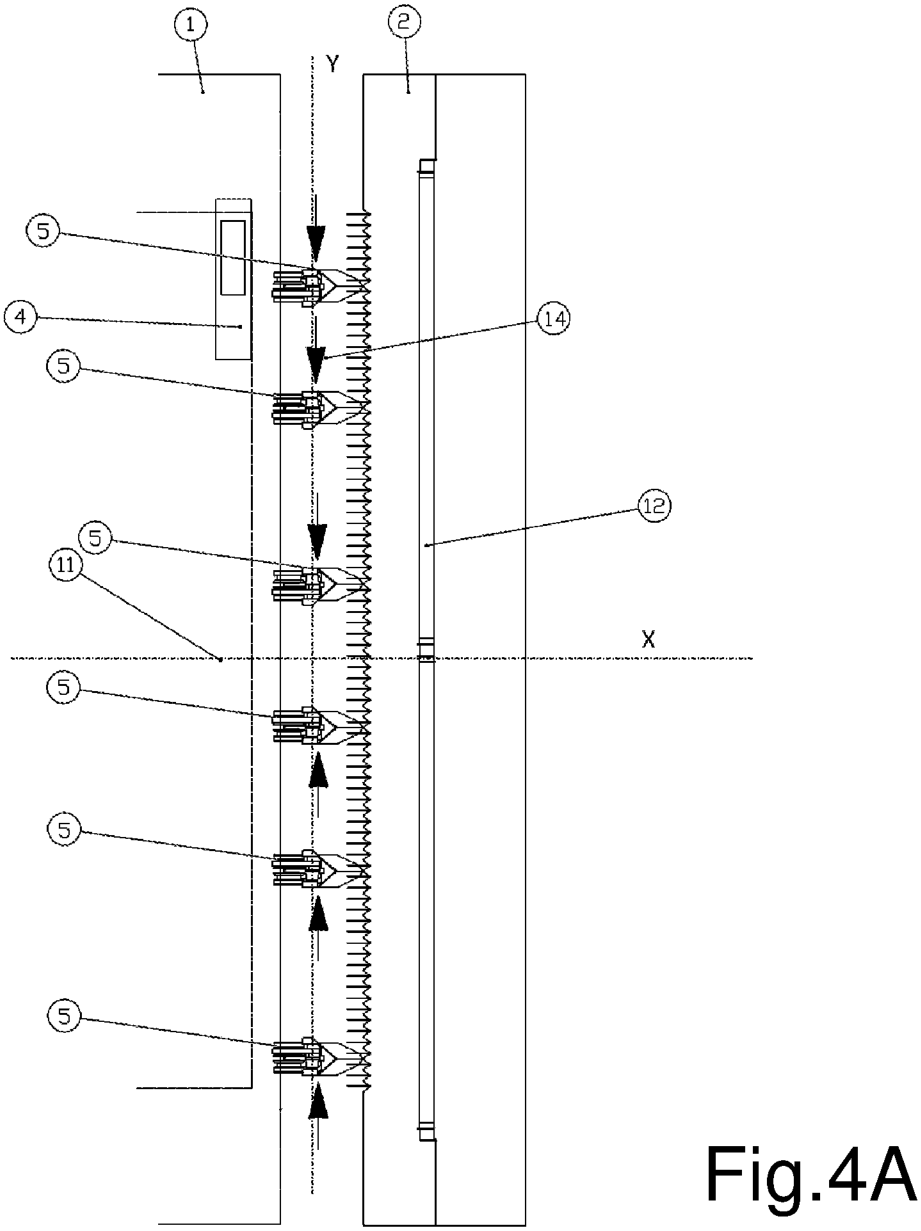
FIG. 4A represents a schematic top view of the automatic cutting device according to the present disclosure in the open configuration of the array of fins and in which the longitudinal cutting units have been brought within the transverse cutting zone at predetermined distances to cut lengthwise the printed support.

With reference to FIGS. 2A-6B, it is possible to see an automatic cutting device for printed supports 11 having a feeding direction of a printed support to be cut according to a longitudinal axis X. Along this feeding direction a first sliding plane 1 of the printed support 11 to be cut and a second sliding plane 2 of the support 11 which has been cut are disposed in sequence. The second sliding plane 2 is placed at a certain distance from the first sliding plane along the feeding direction and defines, together with the first sliding plane 1, a transversal cutting zone having a main development along a transversal axis Y, perpendicular to the longitudinal axis X.

The automatic cutting device comprises at least two longitudinal cutting units 5 and it is configured to be able to move along the transverse axis Y inside the transverse cutting zone so as to intercept and cut the printed support 11 according to at least a certain direction parallel to the longitudinal axis (X).

In the embodiment illustrated in the figures, the longitudinal cutting units 5 are in particular six so as to allow the fractioning of the printed support up to seven portions. The movement of the longitudinal cutting units 5 is controlled by an electronic control unit (not shown in the figure) in data communication with position sensors and actuators included in each longitudinal cutting unit 5 which respectively allow the detection of the position and the movement with respect to the transverse Y axis.

More specifically, each cutting unit 5 has a rest position, outside the portion of the transverse cutting area crossed by a printed support 11, and a cutting position, inside this portion. The spatial coordinate along the transverse axis Y of each longitudinal cutting unit 5 is determined by the commands of the control unit based on specific preset parameters for the particular type of printed support 11 to be cut or is based on information read from printed support 11 itself, as will be seen better later. For simplicity, below, reference will be made to the set of spatial coordinates along the transverse Y axis of each of the longitudinal cutting units 5 as the "state" of the longitudinal cutting units 5.

The automatic cutting device advantageously comprises an array of fins 14 arranged in a comb, supported in cantilever fashion at the second sliding plane 2. The array of fins is configured to move, controlled by the electronic control unit, from a closed configuration, in which all the fins 14 protrude from the second sliding plane 2 and occupy the transverse cutting zone, to an open configuration in which the fins 14 leave free the transverse cutting zone so as to allow undisturbed movement along the transverse axis Y of the longitudinal cutting units 5.

This array of fins 14 is configured, when in closed configuration, to support the printed support and/or portions of the printed support 11 cut according to directions parallel to the longitudinal axis X, from the first sliding plane to the second sliding plane. In this way, the risk of jam due to printed media not reaching the second sliding plane is eliminated.

Figure 5B:
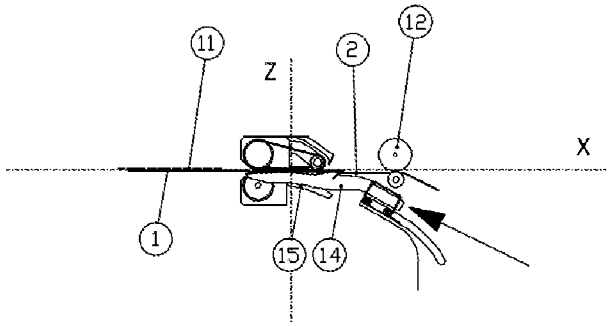
FIG. 5B represents a profile view of the device of FIG. 5A.
Figure 5A:
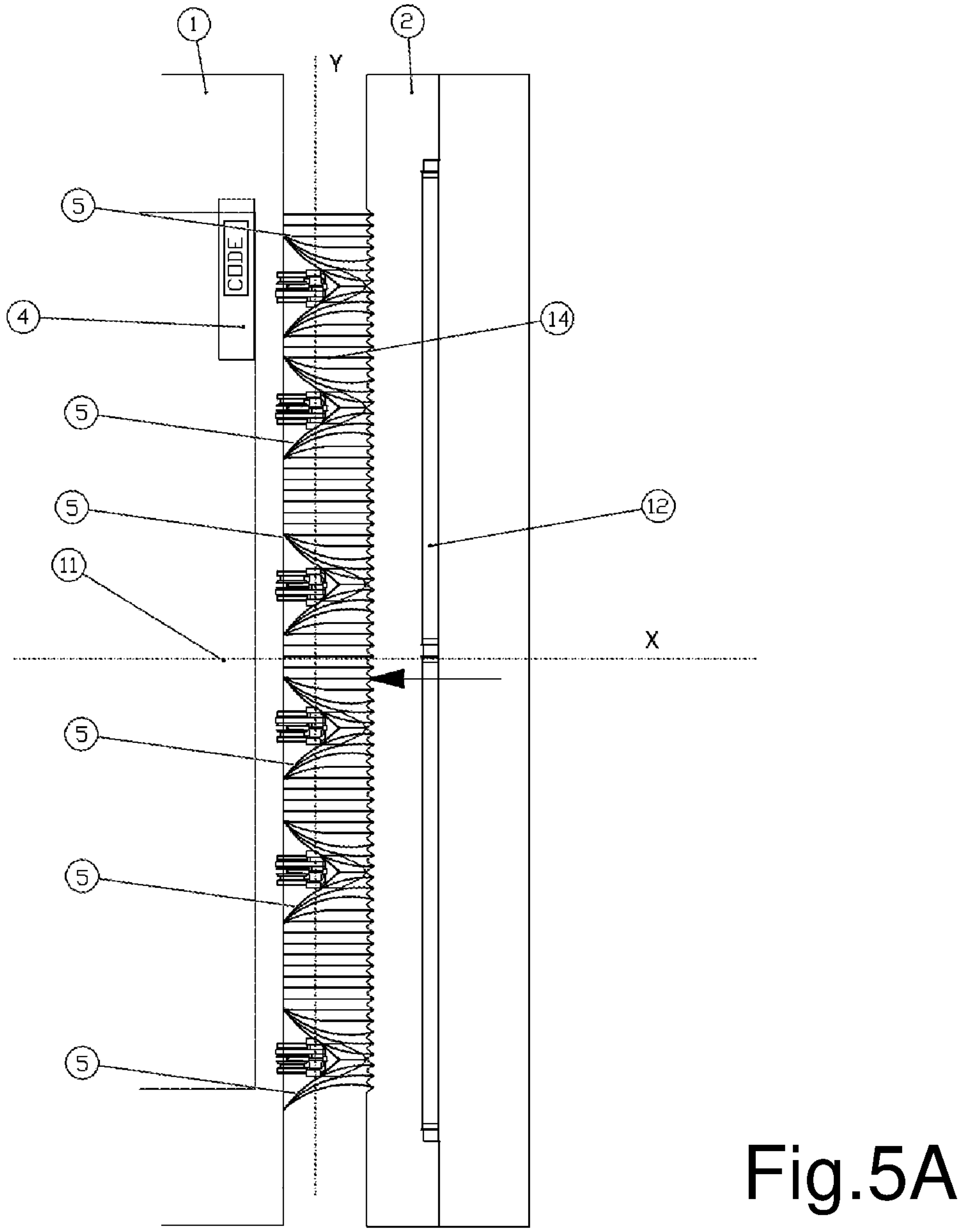
FIG. 5A represents a schematic top view of the automatic cutting device according to the present disclosure in the closed configuration of the array of fins with the longitudinal cutting units within the transverse cutting area at predetermined distances to cut the printed support longitudinally.
Figure 6B:
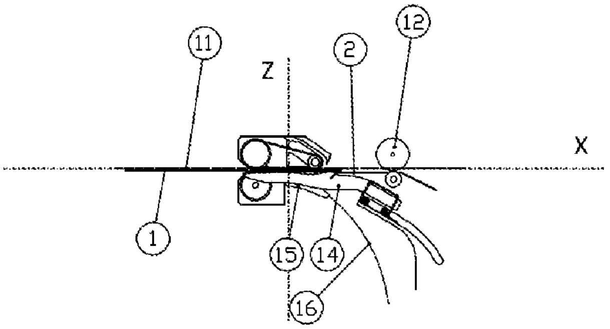
FIG. 6B represents a profile view of the device of FIG. 6A.
Figure 6A:
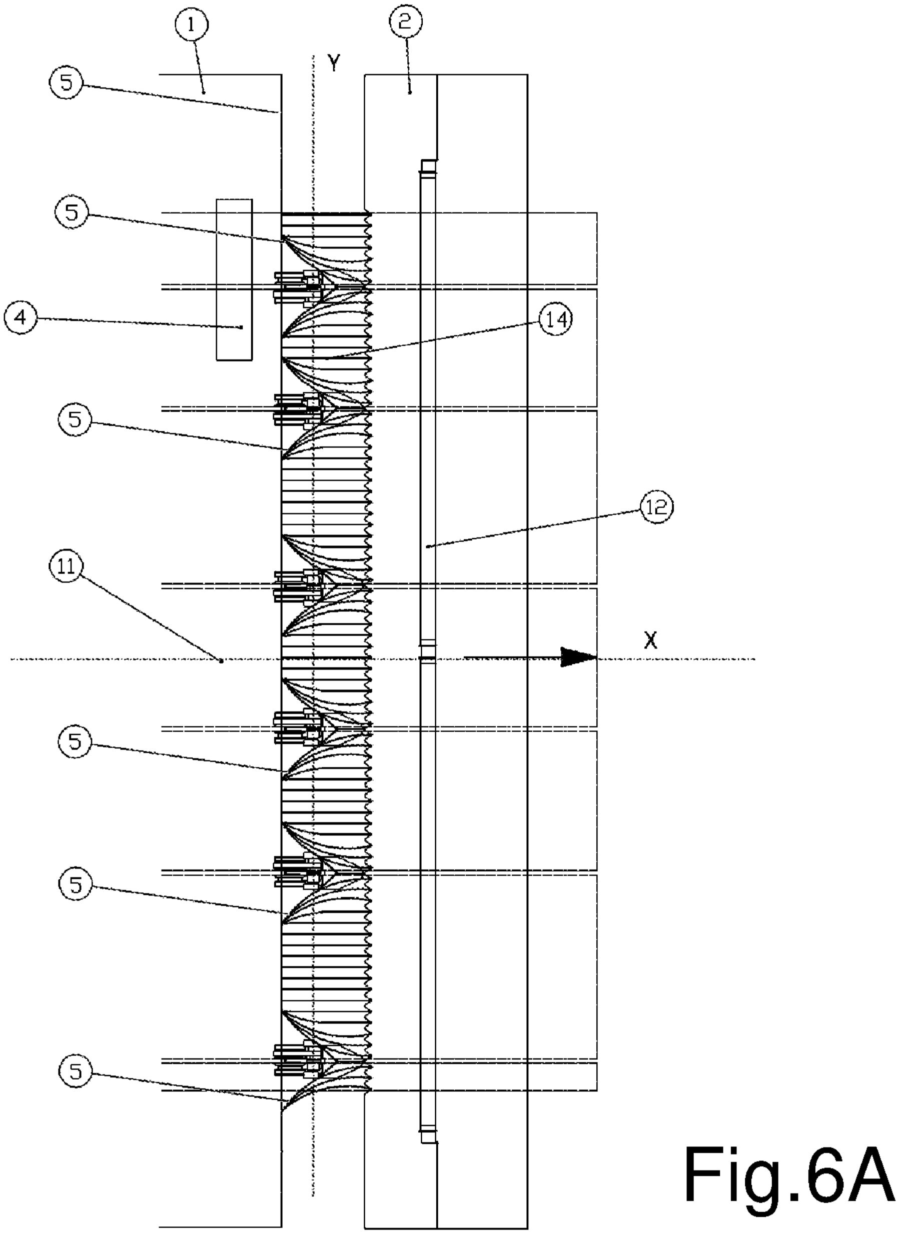
FIG. 6A represents a schematic top view of the automatic cutting device of FIG. 5A during the cutting of a printed support.

Each of the fins 14 is elastically constrained in the array of fins 14 so that it can be elastically deformed along the transverse axis Y. In this way, when one or more fins 14 pass from the open configuration to the closed configuration and intercept a longitudinal cutting unit 5 placed in the cutting position, they come into contact with this cutting unit 5 and modify their trajectory by flexing as shown in FIGS. 5A and 6A. In other words, the overall movement of the array of fins 14, when it passes from the open to the closed configuration, is not impeded as a whole thanks to the deformation along the transverse axis Y by fins 14 which intercept a longitudinal cutting unit 5.

According to one aspect, the fins 14 have a main development according to a direction parallel to the longitudinal axis X and are configured to resist deformation according to a vertical axis Z, perpendicular to the sliding plane.

More particularly, the array of fins 14 comprises a base structure and a plurality of fins 14 rigidly constrained thereto at one end of its extremities. The base structure is moved so that, when the array of fins 14 passes from the closed configuration to the open configuration, the fins 14 and the base structure slide below the second sliding plane.

According to one aspect, each cutting unit 5 also comprises a wedge-shaped guide 15 facing the second sliding plane 2 and configured to further facilitate the plastic deformation of the fins 14 by directing them outwards from the transverse cutting area.

According to one aspect, each cutting unit 5 is configured to cut the printed support 11 according to two directions parallel to the longitudinal axis X. The internal surface of the wedge-shaped guide 15, i.e. the surface facing the first sliding plane, is configured to direct the scrap 16, i.e. the printed support portion 11 comprised between these two cutting directions, below the second sliding plane so that it can be easily collected.

According to one aspect, the automatic cutting device comprises, at the second sliding plane 2, unloading rollers 12 configured to pick up the printed support 11 following any one or more cuts made by the cutting units 5.

The automatic cutting device is particularly advantageous in combination with the optical code recognition device described in the Italian patent application 102019000011847 by the same applicant. According to one aspect, the automatic cutting device for printed media 11 comprises an optical code reader 4, at the first sliding plane, configured to read an optical code 3 on the printed support 11 entering the first sliding plane 1. The electronic control unit is programmed to interpret the data corresponding to the optical code 3 to obtain information relating to the status of the longitudinal cutting units 5 necessary for processing the printed support 11 entering the first sliding plane 1.

If a different state of the longitudinal cutting units 5 is required compared to the current state, then the control unit commands in sequence:

- an actuator (not shown in the figure) for moving the array of fins 14 from the open configuration to the closed configuration;
- one or more actuators (not shown in the figure) to move the respective one or more longitudinal cutting units 5 to bring them to the desired state of the longitudinal cutting units 5 necessary for processing the printed support 11 entering the first sliding plane 1; and
- an actuator (not shown in the figure) for moving the array of fins 14 from the closed configuration to the open configuration.

Subsequently, the electronic control unit will manage the cutting operations as in the cutting devices of the prior art and will maintain the same state of the longitudinal cutting units until different instructions are received; it will behave in the same way even if a change of status is not necessary as described above. It is to be understood that the information on the desired state of the longitudinal cutting units could be provided via direct input to the control unit if the printed support is not present or is illegible.

Thanks to the automatic cutting device described in the present disclosure, the cutting of printed supports of various kinds becomes even more practical because whatever their weight per unit area and their resistance to deformation, the support will not be able to slip underneath of the second slide plane, causing jam that are now frequent. All this while maintaining the advantages of a cutting device whose longitudinal cutting units can be positioned at will along the transverse Y axis in order to obtain trimmed prints of any size.

The invention claimed is:

1. An automatic cutting device for printed supports comprising:

- a feeding direction of a printed support;
- a first sliding plane surface in the feeding direction of the printed support to be cut;
- a second sliding plane surface in said feeding direction of said printed support after said printed support has been cut, wherein said second sliding plane surface is placed at a distance from said first sliding plane surface along said feeding direction and defines together with the first sliding plane surface a transversal cutting area having a largest dimension along a transverse axis, perpendicular to the feeding direction;
- at least two cutting units configured to be able to move along the transverse axis within the transversal cutting area so as to intercept and cut the printed support; and
- an electronic control unit configured to control the movement of the at least two cutting units;

wherein

- the automatic cutting device further comprises an array of fins arranged in a comb, cantilever supported at said second sliding plane surface, wherein the fins of said array of fins are cantilever supported along a direction parallel to said feeding direction and are elastically constrained in said array of fins so that the fins can be elastically flexed along the transverse axis, wherein said array of fins:

is configured to move, controlled by the electronic control unit, from a closed configuration, in which all the fins protrude from said second sliding plane surface towards the first sliding plane surface and occupy the transversal cutting area, to an open configuration in which the fins are retracted and leave free said transversal cutting area so as to allow undisturbed movement along the transverse axis of the at least two cutting units, wherein when the fins of said array of fins pass from the open configuration to the closed configuration and intercept said at least two cutting units placed in the cutting position, the fins come into contact with the at least two cutting units and modify the direction of the fins by flexing along the transverse axis, and the automatic cutting device further is configured, when in closed configuration, to sustain the printed support and/or cut portions of the printed support when a free edge of the printed support passes from the first sliding plane surface to the second sliding plane surface.

2. The automatic cutting device for printed supports according to claim 1, wherein the fins each have a largest dimension according to a direction parallel to said feeding direction and are configured to resist deformation according to a vertical axis perpendicular to the second sliding plane surface.

3. The automatic cutting device for printed supports according to claim 1, wherein said at least two cutting units each comprise a wedge-shaped guide facing the second sliding plane surface configured to facilitate an elastic deformation of the fins directing them towards the outside of the transversal cutting area.

4. The automatic cutting device for printed supports according to claim 3, wherein the each of said at least two cutting units is configured to cut the printed support according to two directions parallel to said feeding direction, and the wedge-shaped guide is configured to direct a scrap below the second sliding plane surface.

5. The automatic cutting device for printed supports of claim 1, comprising an optical code reader, at the first sliding plane surface, configured to read an optical code on a printed support entering the first sliding plane surface, wherein each cutting unit of said at least two cutting units comprises a position sensor which detects the position of said each cutting unit with respect to the transverse axis, wherein the electronic control unit is configured to communicate data with said optical code reader and with the position sensors of each of the said at least two cutting units and is programmed to interpret data corresponding to the optical code to command:

an actuator for moving the array of fins from the open configuration to the closed configuration and/or vice versa; and one or more actuators for moving said at least two cutting units along said transversal cutting area.

* * * * *